Figure 1:
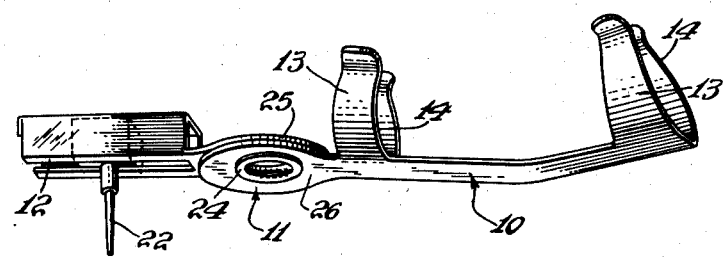

April 1, 1952 — V. W. MINTZ — 2,591,183
DENTAL PARALLELING DEVICE
Filed Sept. 2, 1950 — 2 SHEETS—SHEET 1

Inventor
Victor W. Mintz
By [signature]
Attorney

April 1, 1952 V. W. MINTZ 2,591,183
DENTAL PARALLELING DEVICE
Filed Sept. 2, 1950 2 SHEETS—SHEET 2
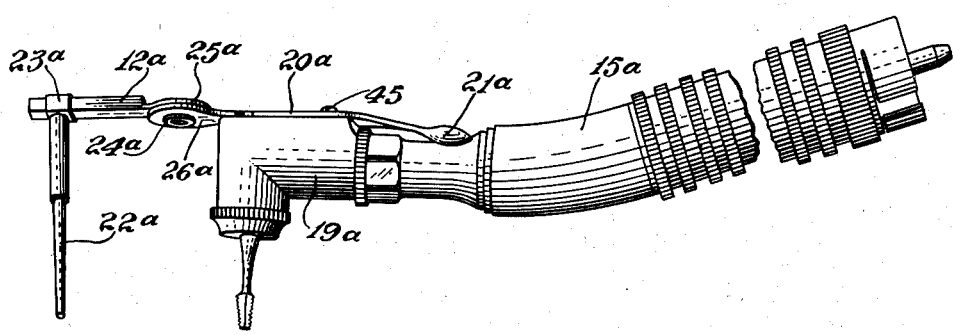
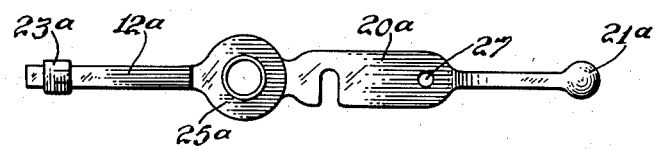
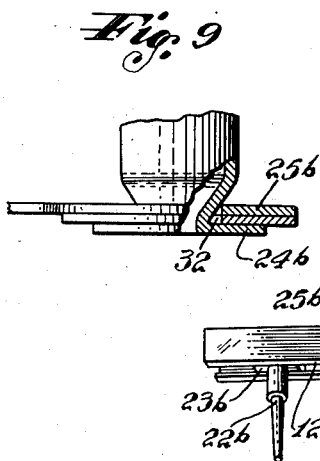
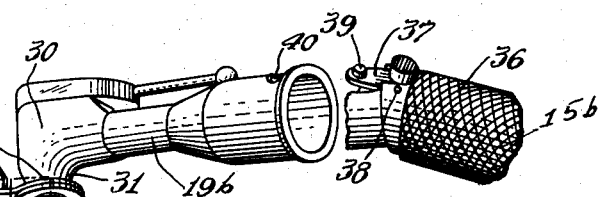
Inventor
Victor W. Mintz
By Harry Sommers
Attorney Patented Apr. 1, 1952

2,591,183

UNITED STATES PATENT OFFICE 2,591,183

DENTAL PARALLELING DEVICE

Victor W. Mintz, Maplewood, N. J.

Application September 2, 1950, Serial No. 182,920

3 Claims. (Cl. 32—67)

This invention relates to a device or attachment for dental contra-angles, to be used for the purpose of paralleling teeth or grooves of teeth in crown and bridge work and for paralleling work in precision attachments for partial denture work. The device may be selectively secured to and removed from the conventional contra-angle in a simple and rapid manner, in certain of the forms thereof, for cooperation therewith without impeding the rotation of the burr. Pursuant to the invention, a pivot pin is carried by an extension arm which is rotatable relative to the burr in either direction. The parallel pivot pin may be used as a guide for paralleling the grooves or teeth and to enable the operator to readily adjust the distance between the pivot and burr. By rotating the extension arm portion of the device, the operator may use teeth located in the portion of the jaw opposite that in which the pin is located, as a guide.

Figure 2:
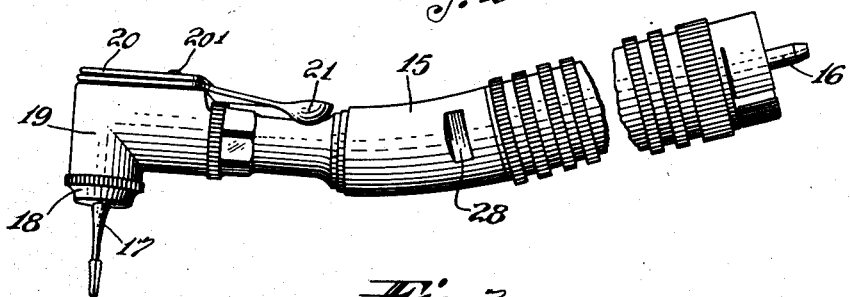
Figure 3:
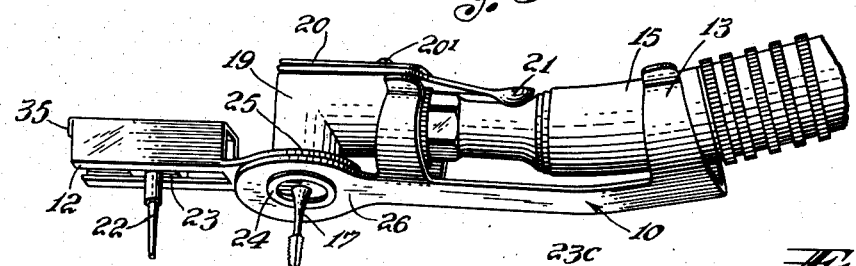
Figure 4:
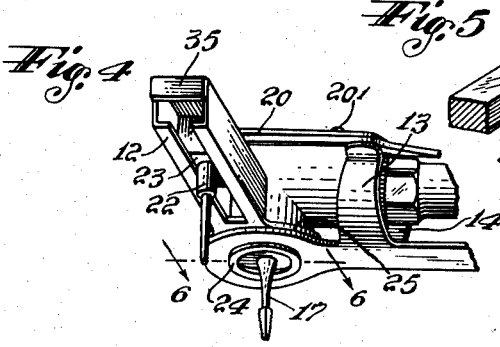
Figure 5:
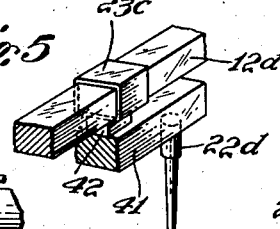
Figure 6:
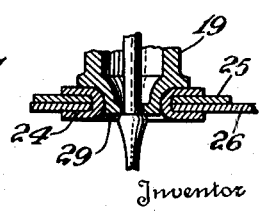

In the drawings:

Fig. 1 is a perspective view of a paralleling device embodying the invention in the form in which the same may be secured to a dental contra-angle, Fig. 2 is a perspective view of the dental contra-angle to which the device of Fig. 1 may be secured, as shown in the assembled perspective view—Fig. 3, Fig. 4 is a fragmentary perspective view showing the extension arm of the device swivelled to a position substantially 90° to that shown in Fig. 3, Fig. 5 is a fragmentary perspective view of a modified form of the invention, wherein the pivot pin head is of C-shaped cross-section to facilitate movement of the pivot pin to a closer position relative to the burr, Fig. 6 is a fragmentary sectional view taken on line 6—6 of Fig. 4, Fig. 7 is a perspective view of another form of device embodying the invention, shown secured to a contra-angle, Fig. 8 is a top plan view of the device alone, Fig. 9 is a perspective view of another form of the invention, and Fig. 10 is a partly fragmentary sectional view of the lower end of the contra-angle head of said form.

In Figs. 1–6 of the drawings, the device of the invention is shown to comprise a support bar or strip 10, to one end of which an elongated extension arm 12 is secured by a swivel unit 11. The bar is provided with bowed, flexible clamp fingers or jaws 13, 14 preferably disposed at each end thereof, adapted to embrace the contra-angle 15 as shown in Fig. 3. If desired, the contra-angle may be provided with recessed portions, as indicated at 28 in Fig. 2, to facilitate registration of the fingers with the contra-angle. However, this is not essential.

The contra-angle 15 conventionally serves as a bearing for the drive shaft 16 which drives the burr end 17 projecting through the shouldered end 18 of the head 19 of said contra-angle, said burr being held in said head by the locking arm 20 having a boss 21 at the free end thereof to frictionally engage the contra-angle when the locking arm 20 is bolted to said head as by means of the stud 20' or the like.

Throughout the several views of the drawings, parts marked with a main reference character having a letter suffix "a" or "b" correspond to parts shown in other figures and therein designated by such reference character alone.

A parallel pivot pin 22 is provided with a head 23 which is shown in Figs. 1–6 as having telescoping engagement with the elongated extension arm 12 so as to permit the pivot pin 22 to be moved therein relative to the swivel 11 (and thus burr 17 projecting therethrough). The extension arm 12 and support bar 10 are generally disposed in the plane of the swivel unit 11 and are respectively secured to plates 25, 26 of the swivel unit, said plates having apertures through which the swivel ring 24 is passed. The head of the pivot pin may be provided with an offset portion, as indicated at 41 in Fig. 5, showing a head of C-shaped cross-section, the pivot pin 22d being fixed to the end of the portion 41 remote from the point 42 of connection with the head 23c (the open end of the C). By this arrangement, it will be apparent that the pivot pin may be brought to a position extremely close to the burr by simply sliding said pivot pin along the extension arm and to the end thereof adjacent the swivel unit. The swivel ring 24, as shown in Fig. 6, is provided with an internally shouldered portion 29 of an outline and proportions corresponding with the shouldered end 18 of the head 19 of the contra-angle. As shown in Figs. 3 and 6, when the support bar 10 is secured to the contra-angle, the shouldered end 18 of the head 19 of the contra-angle is seated in the swivel ring 24. The swivel unit 11 permits the elongated extension arm 12 to be rotated to the right or left relative to the burr 17. The pin 22 is slidably disposed in said elongated extension arm 12 and may thus be moved to that position relative to the swivel ring 24 (and thereby the burr 17), as is dictated by the requirements of the particular dental problem involved. By rotating the extension arm, the operator may use the teeth on the side of the jaw opposite to the tooth in which the burr 17 is disposed, as a guide. In Fig. 4, the extension arm 12 is shown substantially at right angles to its position in Fig. 3. It will be apparent, from an examination of said figures, that the extension arm may be rotated almost 180° to the left and to the right, if desired.

In the form shown in Figs. 7 and 8, the conventional locking arm 20 of the contra-angle shown in Fig. 2 is dispensed with; support bar 20a is provided with a boss 21a at one end for engagement with the contra-angle 15a, the other end thereof being provided with a plate 26a. The extension arm 12a is fixed to plate 25a swively connected to the plate 26a by any suitable means, such as the swivel means 24a. A pin 22a is provided with a head 23a slidably engaging said extension arm 12a. The support bar 20a is fixed to the head 19a of the contra-angle by a stud 45 or the like passing through the aperture 27 and engaging said head. In Figs. 9 and 10, the contra-angle head unit 19b is formed for removable attachment to the contra-angle 15b. The latter is indicated fragmentarily at 36 as being provided with a plate 37 pivotally mounted on the contra-angle as at 38 and having a pin 39 which is adapted to be passed through the aperture 40 of the head unit 19b to secure said unit to the contra-angle 36. It will be understood that a drive shaft, corresponding to the drive shaft 16 of Fig. 2 for the contra-angle, passes through the contra-angle 36 of Fig. 10 and engages a suitable complementary driving member within the head unit 19b when the latter is secured to the contra-angle by means such as that indicated at 37 in Fig. 10. Said specific securing means 37 may be varied and any other suitable latching means may be used to secure the head unit 19b to the contra-angle 36 within the spirit and scope of the invention. In the form shown in Figs. 9 and 10, the head unit 19b comprises the casing 30 provided with a downwardly directed tapered portion 31 and having a swivel ring 24b unitary with said downwardly directed tapered portion and defining therewith a recess 32 in which the plate 25b is disposed, said plate having fixed thereto the extension arm 12b in which the head 23b of the pin 22b is slidably disposed.

The extension arm 12 may be provided with a stop member 35 at the free end thereof (Fig. 4) to preclude displacement of the pivot pin therefrom. Any other desired or convenient stop arrangement may be substituted for the purpose in the spirit and scope of the invention. In Fig. 1, the pivot pin 22 is shown as telescopically received within the extension arm 12 which is of channelled cross-section. This arrangement may be reversed, as shown in Fig. 7, in which case the head of the pin telescopically receives the extension arm. The rectangular cross-section of the pivot pin head complements the corresponding cross-section of the extension arm in the forms shown in the drawings to hold the pivot pin constantly registered relative to the burr.

The foregoing description and drawings are illustrative of the essential features of the invention in practical embodiments thereof, all other forms suggested thereby coming within the scope of the appended claims are to be deemed within the purview and intent of this invention.

Having thus described my invention, what I claim as new and desire to secure by Letters Patent is:

1. A dental paralleling device for attachment to a contra-angle comprising a pair of plates disposed one over the other in overlapping relation thereto, overlapping portions of said plates being provided with corresponding apertures, a swivel ring passed vertically through the apertures of the plates and spun over the plates to swivelly secure them together in alignment and of a diameter adapting it to fit about the burr end of a contra-angle with the burr projecting through the ring, a bar fixed at one end to one of the plates and extending in the general axial plane thereof, bowed flexible clamp fingers fixed to and extending upwardly of said bar in transversely opposed position at each end of the bar to frictionally embrace the contra-angle, an elongated extension arm fixed to the other plate and extending in the general plane thereof, a pivot pin, and a head on said pin slidably engaging said arm for disposing the pivot pin parallel to the burr and mounting the pivot pin for movement along the arm to adjusted positions relative to the swivel ring.

2. A dental paralleling device for attachment to a contra-angle comprising a pair of plates, means to swivelly connect said plates, a bar fixed at one end to one of the plates and extending in the general axial plane thereof, flexible clamp fingers fixed to and extending upwardly of said bar in transversely opposed position to frictionally embrace the contra-angle, a hollow elongated extension arm fixed to the other plate and extending in the general plane thereof, said arm being open at its outer end and having side walls and inwardly extending flanges along lower edges of its side walls, a pivot pin, and a head on said pin slidably mounted in said arm for movement of the pin therealong relative to the swivel ring and resting upon said flanges.

3. A dental paralleling device as set forth in claim 2, stop means partially closing the open outer end of said arm to preclude displacement of the pivot pin therefrom.

VICTOR W. MINTZ.

REFERENCES CITED

The following references are of record in the file of this patent:

UNITED STATES PATENTS

| Number | Name | Date |
|---|---|---|
| 1,321,130 | Schlueter | Nov. 11, 1919 |
| 1,557,164 | Hofshneider | Oct. 13, 1925 |
| 2,224,264 | Jeanneret | Dec. 10, 1940 |
| 2,399,231 | Klein et al. | Apr. 30, 1946 |